United States Patent [19]
Derecktor

[11] Patent Number: 5,494,327
[45] Date of Patent: Feb. 27, 1996

[54] SLIDING CONNECTION FOR RELEASABLY AND ADJUSTABLY ATTACHING AN OVERHEAD RACK TO A PICKUP TRUCK

[75] Inventor: Thomas E. Derecktor, Fall River, Mass.

[73] Assignee: TracRac, Inc., Fall River, Mass.

[21] Appl. No.: 381,134

[22] Filed: Jan. 31, 1995

[51] Int. Cl.[6] ........................................ B60P 3/00
[52] U.S. Cl. ............................ 296/3; 224/405; 410/150
[58] Field of Search .............................. 296/3, 98, 100, 296/32, 35.3, 36, 37.6, 43, 105; 224/42.45 R; 410/150

[56] References Cited

U.S. PATENT DOCUMENTS

| | | |
|---|---|---|
| 3,229,994 | 1/1966 | Klein . |
| 3,762,763 | 10/1973 | Deshores ................................. 296/100 |
| 3,901,548 | 8/1975 | Seaman, Jr. . |
| 4,215,894 | 8/1980 | Sidlinger . |
| 4,398,763 | 8/1983 | Louw . |
| 4,527,827 | 7/1985 | Maniscalco et al. ....................... 296/3 |
| 4,650,383 | 3/1987 | Hoff . |
| 4,969,784 | 11/1990 | Yanke . |
| 4,974,898 | 12/1990 | Baranski ................................. 296/100 |
| 5,002,324 | 3/1991 | Griffin . |
| 5,052,739 | 10/1991 | Irwin ...................................... 296/100 |
| 5,137,320 | 8/1992 | Christensen . |
| 5,139,375 | 8/1992 | Franchuk . |
| 5,143,415 | 9/1992 | Boudah ...................................... 296/3 |
| 5,152,570 | 10/1992 | Hood . |
| 5,190,337 | 3/1993 | McDaniel . |
| 5,203,603 | 4/1993 | Hertzberg et al. ....................... 296/100 |
| 5,238,280 | 8/1993 | Christensen . |
| 5,303,858 | 4/1994 | Price . |
| 5,310,238 | 5/1994 | Wheatley ................................. 296/100 |
| 5,316,190 | 5/1994 | Bullock . |
| 5,393,114 | 2/1995 | Christensen ................................. 296/3 |

*Primary Examiner*—Dean Kramer
*Attorney, Agent, or Firm*—Salter & Michaelson

[57] ABSTRACT

A sliding connection especially suited for releasably and adjustably attaching an overhead rack or the like to side walls of a pickup truck includes a track mountable on the side wall of the pickup truck, and a sliding lock assembly releasably attachable to the rail member. The track includes an elongate tubular body having a bottom surface engagable with the side wall of the pickup truck and a top surface opposite the bottom surface, and a plurality of rail members integrally formed with the tubular body and extendable along the length of the body. The sliding lock assembly includes, in one embodiment, a sliding lock member slidably mounted on the rail member of the track and movable along the length of the rail member, and a thumb turn for locking the sliding lock member at a desired position along the length of the rail member.

20 Claims, 4 Drawing Sheets

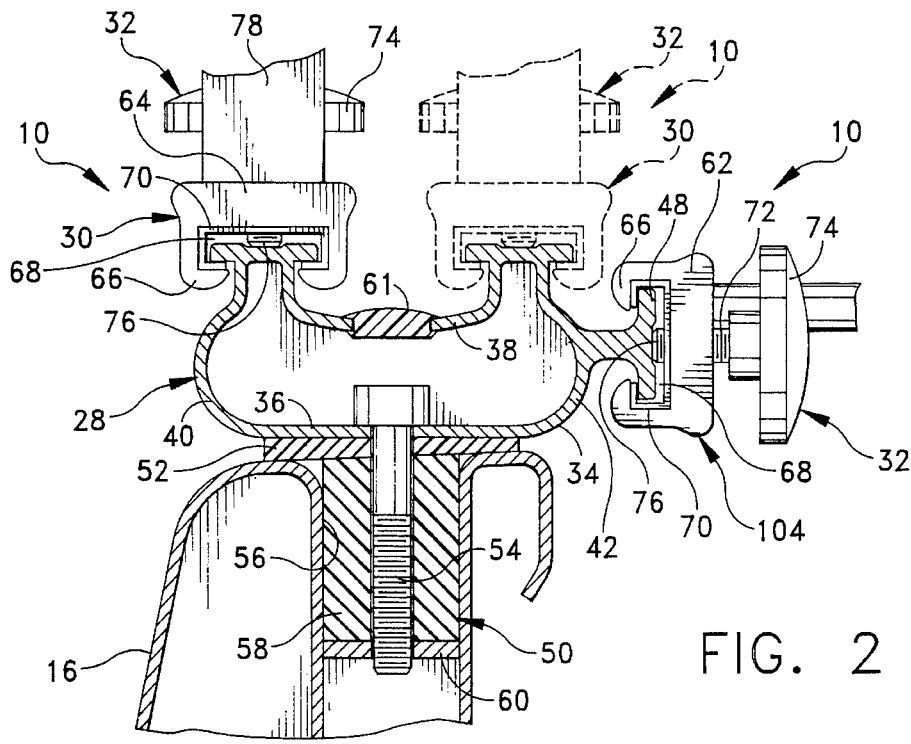
FIG. 2
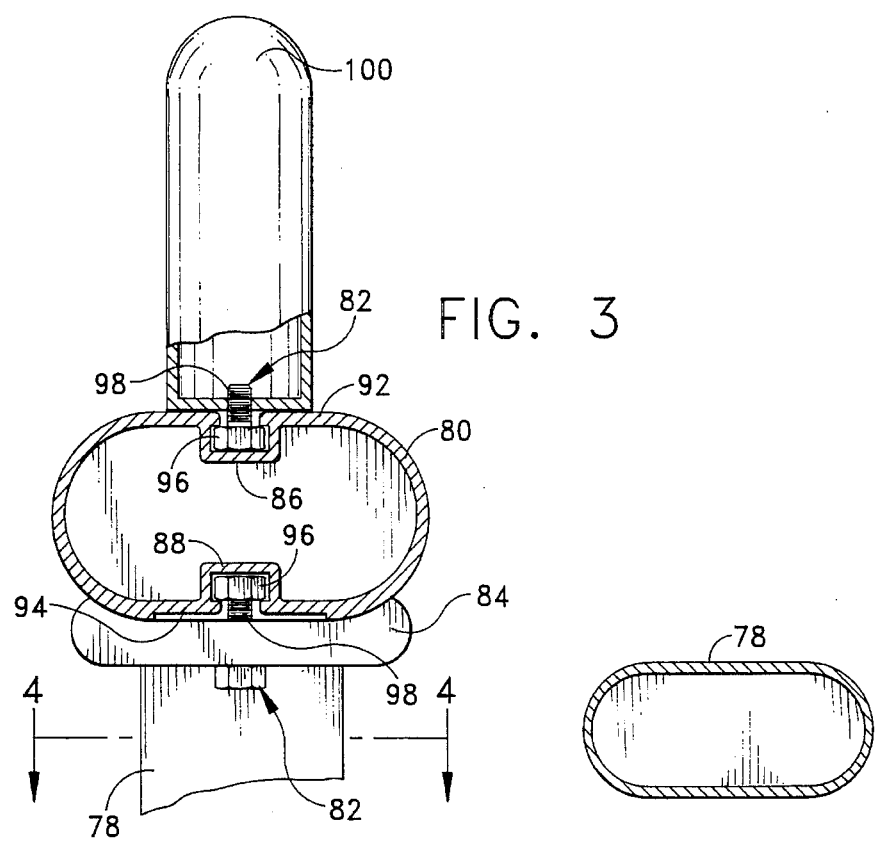
FIG. 3
FIG. 4

SLIDING CONNECTION FOR RELEASABLY AND ADJUSTABLY ATTACHING AN OVERHEAD RACK TO A PICKUP TRUCK

BACKGROUND AND SUMMARY OF THE INVENTION

This invention relates generally to equipment for pickup trucks and more particularly to a releasably attachable and adjustable overhead rack having unique sliding connections for attaching the overhead rack and many other accessories to the pickup truck.

This invention is primarily directed to a sliding connection for releasably and adjustably attaching equipment, such as an overhead rack, to side walls of a pickup truck. In the past, overhead racks were permanently attached to the pickup truck by welding, for example. Since overhead racks sometimes detract from the overall appearance of the pickup truck, releasable overhead racks were developed. It has also been found that racks capable of sliding along the length of the bed of the pickup truck is an advantageous feature along with the rack being removable. One such releasable and adjustable overhead rack is found in U.S. Pat. No. 5,143,415, to Boudah, which discloses two pairs of stanchions slidably mounted on a pair of tracks which are permanently mounted on the sidewalls of the pickup truck. Each stanchion includes a base which is attached to the track by a nut and bolt fastening arrangement. The track has a cross-shaped slot formed therein which runs the length of the track, the slot receiving the nut for slidably mounting the stanchion to the rail track. At their upper ends, the stanchions support four cross members via four corner elements.

A disadvantage associated with this type of releasable overhead rack is that it is difficult to mount other accessories, such as a table saw, vice, or other tool, on the rail. In Boudah, since there is only one slot per track, it is nearly impossible to attach other components to the track which slide along the length of the track independently with respect to the overhead rack.

Another disadvantage is that the connection of the rack to the rail is inadequate in that most designs require cross members to stabilize the rack with an adjacently placed rack. As disclosed in Boudah, the rack assembly requires cross members in order to stabilize the rack. The connection of the overhead rack to the tracks should be of sufficient strength so that cross members are unnecessary.

Accordingly, among the several objects of the present invention are the provision of an improved sliding connection for releasably and adjustably attaching an overhead rack or the like to a pickup truck which is sturdy in design; the provision of such a sliding connection which is capable of mounting a pair of overhead racks to the pickup truck without the need of cross members; the provision of such a sliding connection having a plurality of rail members on each track which receive sliding assemblies for mounting various accessories to the track, the accessories being slidably movable along their respective rail member independently from the overhead rack; the provision of such a sliding connection which easily mounted on side walls of the pickup truck; and the provision of such a sliding connection which is easy to manufacture and durable in use.

In general, a sliding connection of the present invention is especially suited for releasably and adjustably attaching an overhead rack or the like to side walls of a pickup truck. The sliding connection comprises a track mountable on a side wall of the pickup truck, means mounting the track onto a side wall of the truck, and a sliding lock assembly releasably attachable to the rail member. The track comprises an elongate tubular body having a bottom surface engagable with the side wall of the pickup truck and a top surface opposite the bottom surface, and a rail member attached to the tubular body and extendable along the length of the body. The sliding lock assembly comprises a sliding lock member slidably mounted on the rail member of the track and movable along the length of the rail member, and means for locking the sliding lock member at a desired position along the length of the rail member. A second track, identical to the first track, is mounted on the other side wall of the pickup truck, and a second sliding lock assembly is provided for the second track. An overhead rack is mounted on the sliding lock members of the sliding lock assemblies in such a manner that it spans the bed of the pickup truck. The overhead rack is adapted to support items (e.g., small boats, ladders, etc.) above the bed of the pickup truck at any position along the length of the bed.

The rail member of each track is generally rectangular in cross section, and the sliding lock member of each sliding lock assembly is generally C-shaped in cross section. The sliding lock member has a bearing plate having a relatively large surface area and a pair of inwardly formed fingers located along opposite sides of the bearing plate which define an elongate receiving slot sized for receiving the rail member therein. The sliding lock member of each sliding lock assembly is attached to the rail member of the track by sliding the sliding lock member over an end of the rail member. The locking means of each sliding lock assembly comprises a threaded opening formed in the sliding lock member and a stud threadably received in the threaded opening. The stud is adapted to engage the rail member of the track when tightening the stud for locking the sliding lock member to the track. The locking means further comprises a thumb turn member attached at an upper end of the stud, the thumb turn member facilitating the turning of the stud for moving the stud into locking engagement with the rail member when tightening the stud.

In another aspect of the present invention, the track of the sliding connection comprises at least two rail members extending along the length of the side wall of the pickup truck. The sliding connection further includes a sliding lock member slidably mounted on the one rail member of the track and movable along the length of the rail member, and means for locking the sliding lock member at a desired position along the length of the rail member. The sliding lock member is adapted to support equipment, such as overhead racks, a cap, a tonneau cover, load holding devices, tool boxes, vices, saws, and the like.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 2 is a cross-sectional view taken along line 2—2 in FIG. 1;

FIG. 3 is a cross-sectional view taken along line 3—3 in FIG. 1;

FIG. 4 is a cross-sectional view taken along line 4—4 in FIG. 3;

Corresponding reference numerals designate corresponding parts throughout the several views of the drawings.

DETAILED DESCRIPTION OF THE PREFERRED EMBODIMENTS

Figure 1:
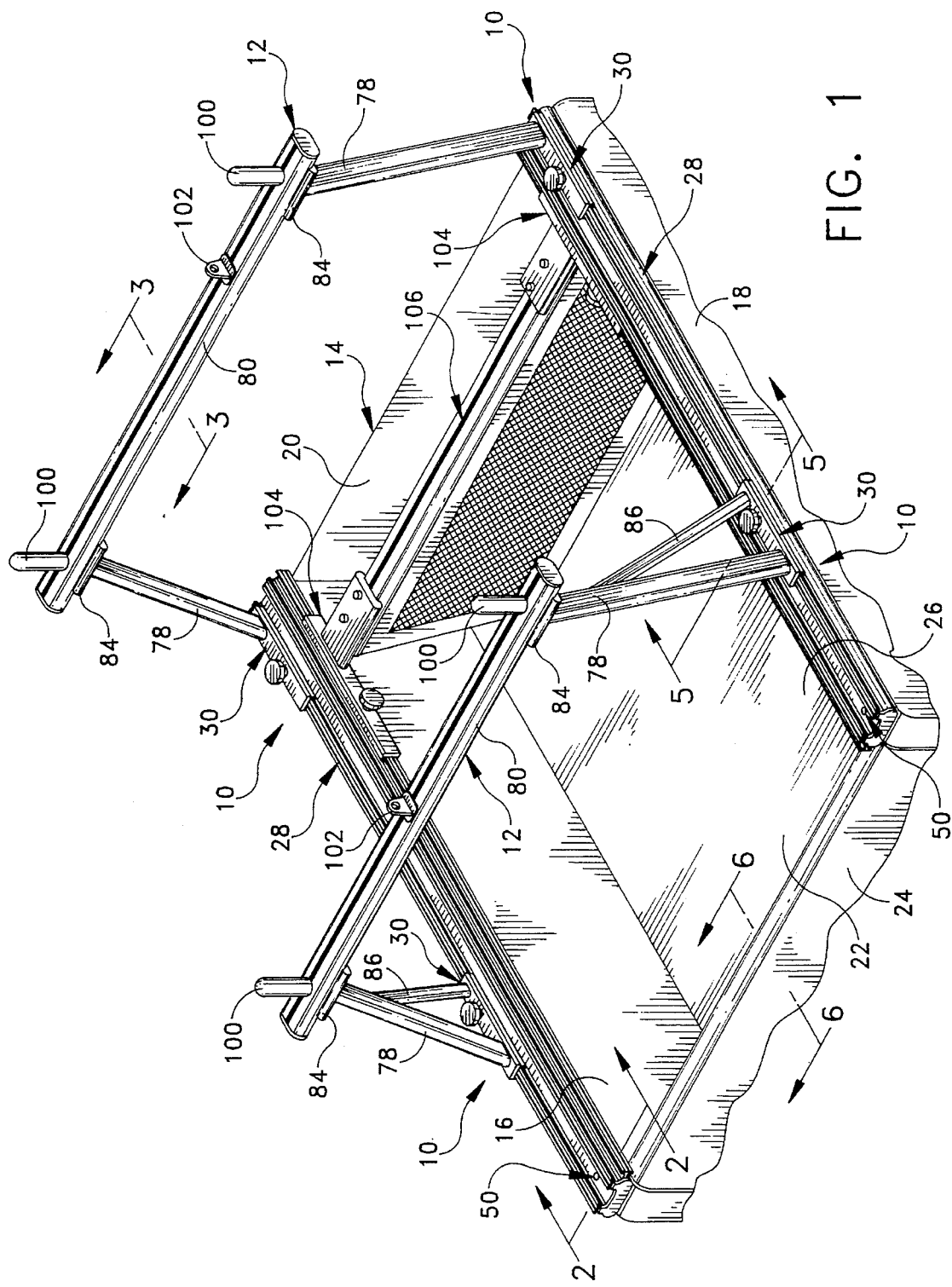
FIG. 1 is a perspective view of an overhead rack having sliding connections of the present invention for mounting the rack and other accessories on side walls of a pickup truck.

Referring now to the drawings, and more particularly to FIG. 1, a plurality of sliding connections, each generally indicated at 10, releasably and adjustably attach a pair of overhead racks, each generally indicated at 12, to a pickup truck, generally indicated at 14. Preferably, the pickup truck 14 is of conventional design, having a pair of spaced-apart side walls 16, 18, a forward wall 20, a bottom wall 22, and a tailgate 24 which together define an open bed 26. However, it should be understood that the sliding connections 10 of the present invention can be adapted to any number of suitable uses and are not just limited to pickup trucks. The sliding connections 10, while being especially suited for slidably and adjustably attaching the overhead rack 12 to the side walls 16, 18 of the pickup truck 14, are also adapted to mount other accessories on the side walls, such as a table saw, vice, or other tool which will be described in greater detail as the description of the sliding connections 10 proceeds.

Generally, each sliding connection 10 comprises a track, such as one of a pair of tracks each generally indicated at 28, mountable on respective side walls 16, 18 of the pickup truck 14, and a sliding lock assembly, such as one of a plurality of sliding lock assemblies each generally indicated at 30. It should be noted that the right-hand track 28 illustrated in FIG. 1 is constructed to be a mirror image of the left-hand track 28. Thus, like parts have been indicated with identical numerals. As illustrated in FIG. 1, four sliding lock assemblies 30 attach the two overhead racks 12 to the side walls 16, 18 of the pickup truck 14 in such a manner that each overhead rack 12 is adapted to slide along the length of the bed 26 of the truck independently of the other. Locking means, generally indicated at 32, associated with the sliding lock assembly 30 is provided for locking the overhead rack 12 at a desired position along the length of the bed 26. The locking means 32 will be described in greater detail below.

Figure 7:
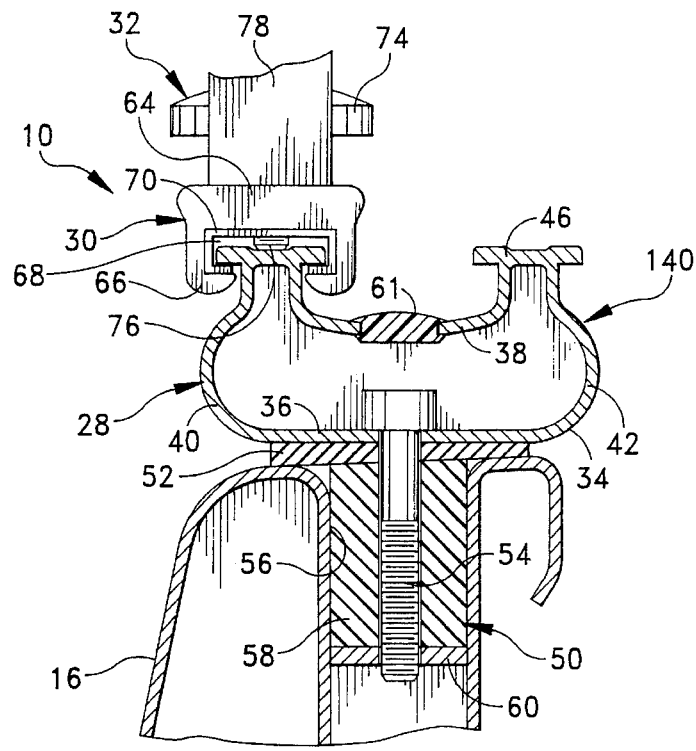
FIG. 7 is a cross-sectional view similar to FIG. 2 illustrating a sliding connection of another preferred embodiment.
Figure 8:
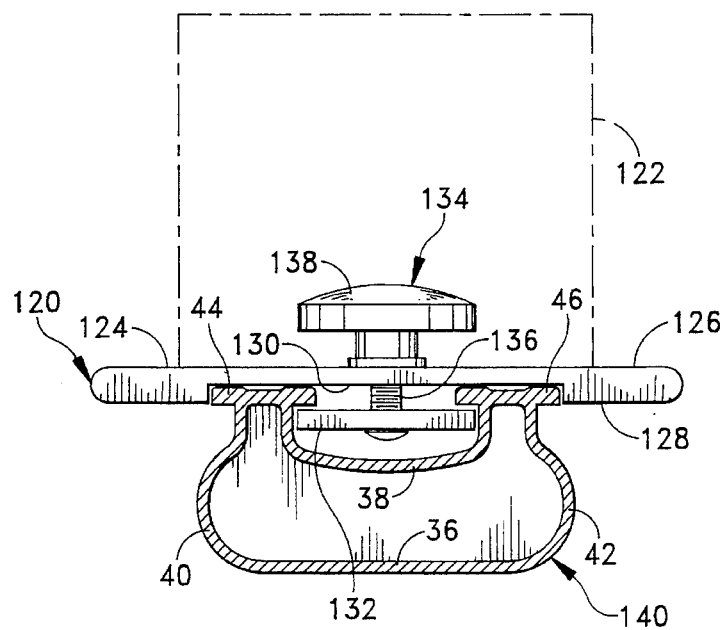
FIG. 8 is a cross-sectional view similar to FIG. 7 illustrating a sliding connection of another preferred embodiment.

Referring now to FIGS. 1 and 2, each track 28 comprises an elongate tubular body 34 having a bottom wall 36 engagable with its respective side wall 16 or 18 of the pickup truck 14, a top wall 38 opposite the bottom wall 36, and opposite side walls 40, 42 connecting the bottom and top walls 36, 38. The elongate tubular body 34 gives the sliding connection 10 of the present invention increased strength compared to prior art connections which attach the posts of the overhead rack directly to the solid rails. Integrally formed with the elongate tubular body 34 are three rail members 44, 46 and 48 each being designed to receive and attach a sliding lock assembly 30 thereon. Each rail member 44, 46 and 48 is generally rectangular in cross section and extends along the length of the tubular body 34. It should be understood that any number of rail members may be provided, such as two rail members as illustrated in FIGS. 7 and 8, and that the provision of three rail members 44, 46 and 48 gives the user added versatility for mounting other items than overhead racks on the track 28. As shown, first and second rail members 44, 46 are mounted on the top wall 38 of the elongate tubular body 34 and the third rail member 48 is mounted on wall side 42 of the body 34. Preferably, each track 28 is fabricated from extruded aluminum which has been found to be easy to manufacture and strong in construction.

Suitable means, generally indicated at 50 in FIG. 2, mounts each track onto its respective side wall of the pickup truck. More particularly, the bottom surface 36 of the elongate tubular body 34 bears against a shim 52 which is disposed between the body 34 and the upper edge of the sidewall 16, 18. In a preferred embodiment, aligned openings are formed in the bottom and top surfaces 36, 38 of the elongate tubular body 34 of the track 28 and a hex-head bolt 54 extends through the aligned openings and into a stake pocket 56 formed in the side wall 16, 18 of the pickup truck 14. Each bolt 54 has a head portion and a thread portion which threadably engages and attaches the track to the side wall (16 or 18) of the pickup truck 14. The stake pockets 56 are upwardly opening cavities formed in the upper edges of the side walls 16, 18 and are commonly found in American made pickup trucks. Typically, there are three stake pockets 56 spaced equidistant along the length of each sidewall 16, 18. An elastomeric spacer 58 is disposed over the bolt 54 and received in the stake pocket 56. As illustrated, the elastomeric spacer 58 substantially fills the cavity of the stake pocket 56. The bolt 54 is threadably attached to a plate 60 at its thread portion whereby the elastomeric spacer 58 is disposed between the shim 52 and the plate 60. The arrangement is such that upon tightening the bolt 54 with a socket wrench or the like, the head portion of the bolt 54 engages the bottom wall 36 of the tubular body 34 and the plate 60 moves upwardly towards the shim 52 and track 28 for expanding the elastomeric spacer 58 laterally outwardly so that the sides of the spacer 58 securely engage the stake pocket 56 thereby securely mounting the track 28 on the side wall 16, 18 of the pickup truck 14. As mentioned above, this method of securing the tracks 28 to the side walls 16, 18 of the pickup truck 14 is particularly effective for American made trucks. It should be noted that the head portion of the bolt 54 is completely disposed within the tubular body 34 for concealing the bolt 54 and for ensuring the positive securement of the track 28 to the side wall (16 or 18) of the pickup truck 14. For other trucks not having stake pockets, suitable nut and bolt fasteners (not shown) are adequate. A plug 61 is provided for covering the opening formed in wall 38.

Referring back to FIGS. 1 and 2, each sliding lock assembly 30 comprises a sliding lock member 62 slidably mounted on its respective rail member 44, 46 or 48 so that it is movable along the length of the rail member. More particularly, the sliding lock member 62 is generally C-shaped in cross section, having a bearing plate 64 with a relatively large surface area and a pair of inwardly formed fingers each indicated at 66 which define an elongate receiving slot 68 sized for receiving the rail member 44, 46 or 48 therein. As with the tracks 28, the sliding lock members 62 are also preferably fabricated from extruded aluminum, however, other suitable materials may be used as well.

Provided within the elongate receiving slot 68 of the sliding lock member 62 is a plastic insert 70 for facilitating the sliding movement of the sliding lock member 62 over the rail member 44, 46 or 48. The sliding lock member 62 is attached to the rail member 44, 46 or 48 by sliding it over an end of the rail member.

As mentioned briefly above, each sliding lock assembly 30 includes locking means 32 for locking the sliding lock member 62 (and thus the overhead rack 12) at a desired position along the length of the bed 26. As illustrated best in FIG. 5, the locking means 32 embodies a threaded opening formed in the sliding lock member and a threaded stud 72 threadably received in the threaded opening. A thumb turn member 74 is attached at the upper end of the stud 72 for facilitating the turning of the stud 72. When tightened, the stud 72 engages the rail member 44, 46 or 48 of the track 28 for locking the sliding lock member 62 to the track 28. More particularly, the stud 72 raises the bearing plate 64 and fingers 66 in a position such that the bearing plate 64 (and plastic insert 70) is spaced from the rail member 44, 46 or 48 of the track 28 and that the fingers 66 of the sliding lock member 62 engage the bottom surfaces of the rail member. It has been found that this arrangement provides a strong attachment of the sliding lock member 62 to the rail member 44, 46 or 48 of the track 28. The lower end of the stud 72 has a plastic tip 76 for engaging the rail member 44, 46 or 48 of the track 28. The plastic tip 76 substantially prevents the stud 72 from gouging the rail member 44, 46 or 48.

Turning now to FIGS. 1 and 3, each overhead rack 12 comprises a pair of posts, each indicated at 78, each post 78 being suitably attached (e.g., by welding) to its respective sliding lock member 62 of the sliding lock assembly 30, and a cross bar 80 interconnecting the posts 78. Preferably, the posts 78 are tubular in construction, as illustrated in FIG. 4, and are attached to the cross bar 80 by nut and bolt fasteners, generally indicated at 82 in FIG. 3, wherein a support piece 84 is interposed between each post 78 and cross bar 80. As illustrated in FIG. 1, the rearward overhead rack 12 includes a pair of braces 86, one for each post 78, which provide added stability to the overhead rack 12. Each overhead rack 12 is also preferably fabricated from extruded aluminum.

Referring particularly to FIG. 3, the cross bar 80 is tubular in cross section and has a pair of oppositely positioned channels 86, 88 formed therein in top and bottom walls 92, 94 of the channel respectively. The bottom, downwardly facing channel 88 receives a nut 96 of the nut and bolt fastener 82, the channel 88 being configured to secure the nut 82 therewithin. The support piece 84 has an opening (not shown) formed therein which receives a bolt 98 of the nut and bolt fastener 82, the bolt 98 being threadably received by the nut 96 for fastening the cross bar 80 to the post 78. This arrangement enables the user of the overhead rack 12 to completely breakdown the overhead rack when it is no longer being used or needs to be transported.

The top, upwardly facing channel 88 may also receive a nut 96 of another nut and bolt fastener 82, for securing articles, such as the lateral detents 100 and tie-downs 102 illustrated in FIG. 1. The detents 100 are designed for limiting the lateral movement of objects, such as ladders, which are placed on the overhead racks 12. Similarly, the tie-downs 102 enable a user to tie down objects. These articles 100, 102 are secured to the cross bar 80 of the overhead rack 12 in a similar fashion to the bar's securement to the support piece 84 of the post 78. FIG. 3 illustrates the manner of attachment of the detent 100.

Figure 5:
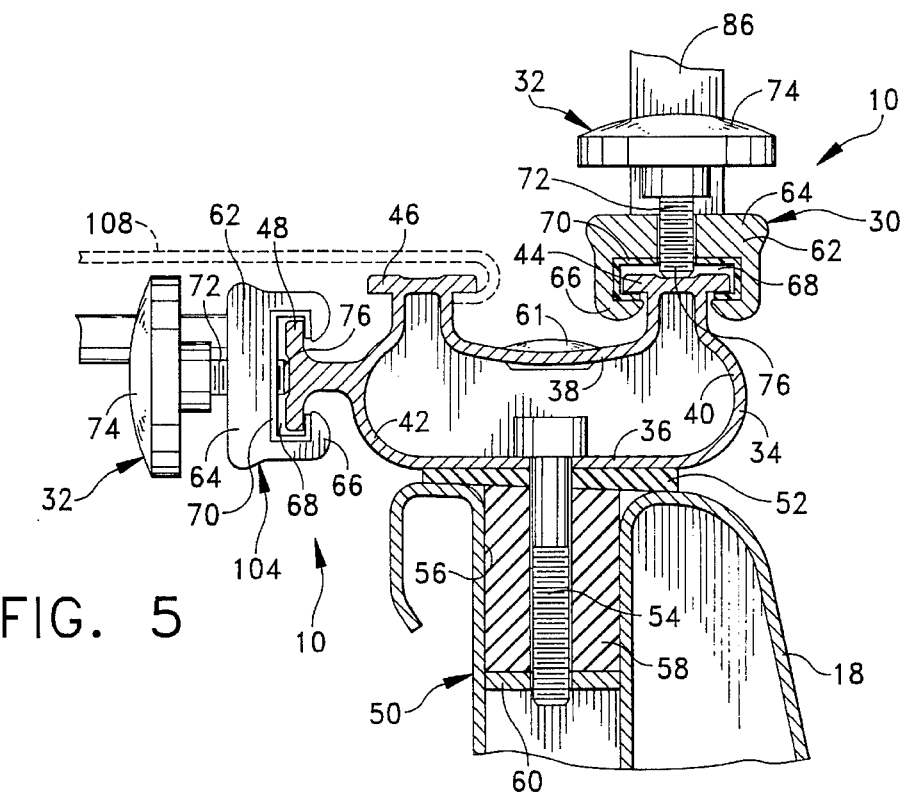
FIG. 5 is a cross-sectional view taken along line 5—5 in FIG. 1.

Turning now to FIGS. 1, 2 and 5, the third rail member 48 of the track 28 on one of the side walls (e.g., side wall 16) of the pickup truck 14 has mounted thereon a sliding lock assembly 104 which is adapted to cooperate with a sliding lock assembly 104 mounted on the third rail member 48 of the track 28 mounted on the other side wall (i.e., side wall 18) of the pickup truck 14. As illustrated best in FIG. 1, the sliding lock assemblies 104 mounted on the third rail members 48 of the tracks 28 are identically constructed as the sliding lock assemblies 30 of the overhead racks 12 and like reference numerals will be used to designate similar parts. Each sliding lock assembly 104 of the third rail member 48 supports a sliding tailgate, generally indicated at 106, which is movable along the length of the bed 26 of the pickup truck 14. The sliding tailgate is suitably attached to the sliding lock member 62 of the sliding lock assembly 104, for example, by welding. The locking means 32 of the sliding lock assembly 104 (e.g., stud 72) securely locks the tailgate 106 at a desired position along the length of the pickup truck bed 26. This feature is especially useful in securely retaining items within the bed 26 of the truck 14 and preventing their movement within the bed. The sliding tailgate 106 can also function as the tailgate itself. It should be noted that since the sliding tailgate 106 operates on a separate rail member (i.e., rail member 48) from the rail member receiving the overhead racks (e.g., rail member 44), the tailgate 106 can be located at any position along the length of the bed 26 of the pickup truck 14. It should also be understood that the tailgate 106 could be slidably mounted on the second rail member 46 with some minor design changes in its attachment to the sliding lock member 62 of assembly 104.

Illustrated in dashed lines in FIG. 5 is a tonneau cover 108 attached directly to the second rail member 46 of the track 28 in conventional fashion. The sliding connection 10 of the present invention enables the simultaneous mounting of a tonneau cover 108 and an overhead rack 12 to the pickup truck 14. A cap (not shown) could also be mounted on the second rail member 46 in a suitable fashion.

Figure 6:
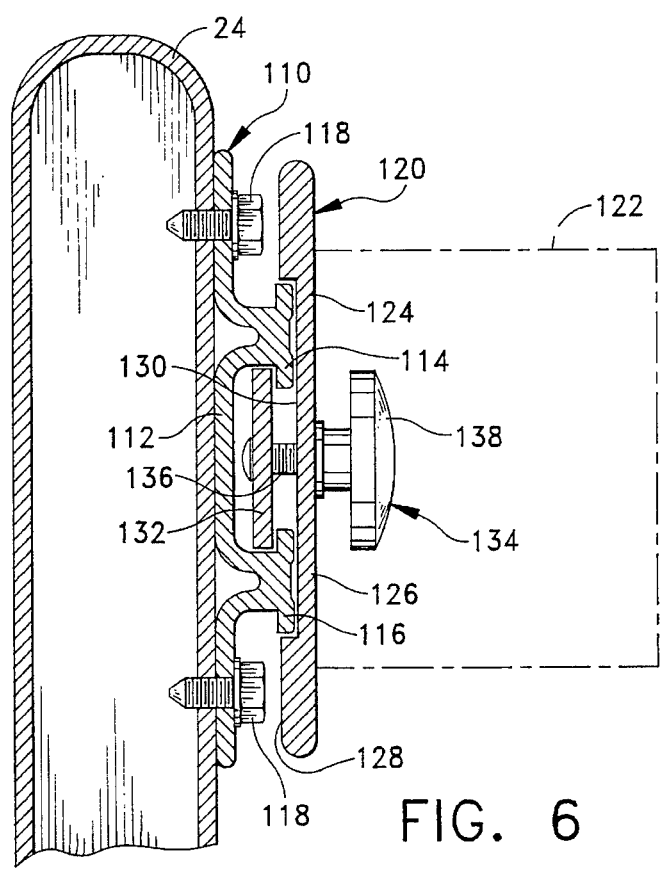
FIG. 6 is a cross-sectional view taken along line 6—6 in FIG. 1.

Turning now to FIG. 6., the tailgate 24 of the pickup truck 14 has mounted thereon a track, generally indicated at 110, of another preferred embodiment. As shown, the track 110 includes a plate 112 of extruded aluminum formed to have two rail members 114, 116 having similar cross sections to the rail members 44, 46 and 48 of track 28. The track 110 is mounted on the tailgate 24 by a plurality of sheet metal screws 118. A modified sliding lock assembly generally indicated at 120, is slidably mounted on the track 110 and is designed for supporting an accessory 122, such as a table saw, vice, or other tool.

The modified sliding lock assembly 120 comprises a plate 124 having a surface 126 adapted to engage and support the accessory 122 and a surface 128 having a recess 130 sized for receiving therein the first and second rail members 114, 116. Since the plate 124 is wider than the sliding lock member 62 of sliding lock assembly 30, it is especially suited for mounting thereon relatively large items, for example, a table saw. The modified sliding lock assembly 120 further comprises an elongate locking member 132 which is received between the first and second rail members 114, 116 in such a manner that the inner edge portions of the first and second rail members 114, 116 are in engagement with the elongate locking member 132. Further provided is means for moving the elongate locking member 132, which is generally indicated at 134, in clamping relation with the first and second rail members 114, 116. The moving means 134 comprises a threaded bolt 136 extending through aligned openings formed in the plate 124 and elongate locking member 132 and a thumb turn mender 138 threadably attached to an end of the bolt 136. The arrangement is such that when tightening the thumb turn member 138, the first and second rail members 114, 116 are clamped between the plate 124 and the elongate locking member 132 for securely retaining the modified sliding lock assembly 120 to the first and second rail members 116, 118.

FIG. 7 illustrates a track generally indicated at 140 having only two rail members 44, 46 instead of three. Track 140 is mounted on the pickup truck 14 identically with respect to track 28. FIG. 8 illustrates a modified sliding lock assembly 120 slidably mounted on track 140.

It should be noted that the sliding connections 10 of the present invention provide strong connections for mounting overhead racks and other accessories to the side walls of a pickup truck. It should also be noted that the connections 10 allow for the easy attachment to, adjustment of, and removal from the pickup truck without any loss of strength or durability.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A sliding connection for releasably and adjustably attaching equipment to a pickup truck, said pickup truck having a pair of spaced-apart side walls and a bottom wall which together defines an open bed, said sliding connection comprising:

a track mountable on a side wall of the pickup truck, said track comprising an elongate tubular body comprising a thin wall which defines substantially the entire outer perimeter of the tubular body, said thin wall having a bottom surface engagable with the side wall of the pickup truck and a top surface opposite the bottom surface, and a rail member attached to the tubular body and extendable along the length of the body;

means mounting said track onto the side wall; and a sliding lock assembly releasably attachable to the rail member, said sliding lock assembly comprising a sliding lock member slidably mounted on the rail member of the track and movable along the length of the rail member, and means for locking the sliding lock member at a desired position along the length of the rail member.

2. A sliding connection as set forth in claim 1 further comprising a second track mounted on the other side wall of the pickup truck, a second sliding lock assembly for said second track, and an overhead rack mounted on said sliding lock members of the sliding lock assemblies in such a manner that it spans the bed of the pickup truck, said overhead rack being adapted to support items above the bed of the pickup truck.

3. A sliding connection as set forth in claim 1, said rail member of the track being generally rectangular in cross section and integrally formed with the elongate tubular body, said sliding lock member of the sliding lock assembly being generally C-shaped in cross section, said sliding lock member having a bearing plate with a relatively large surface area and a pair of inwardly formed fingers which define an elongate receiving slot sized for receiving the rail member therein.

4. A sliding connection as set forth in claim 3, said locking means comprising a threaded opening formed in the sliding lock member and a stud threadably received in the threaded opening, said stud being adapted to engage the rail member of the track when tightening said stud for locking the sliding lock member to the track.

5. A sliding connection as set forth in claim 4, said locking means further comprising a thumb turn member attached at an upper end of the stud, said thumb turn member facilitating the turning of the stud for moving the stud into locking engagement with said rail member when tightening said stud.

6. A sliding connection as set forth in claim 3, said track further comprising a second rail member mounted on said elongate tubular body, said second rail member being adapted to receive a sliding lock assembly thereon.

7. A sliding connection as set forth in claim 6, said first and second rail members being mounted on said top surface of the elongate tubular body.

8. A sliding connection as set forth in claim 7 further comprising a modified sliding lock assembly comprising a plate having a surface adapted to support an accessory and a surface having a recess sized for receiving the first and second rail members therein, an elongate locking member received between the first and second rail members in such a manner that inner edge portions of the first and second rail members are engageable with the elongate locking member, and means for moving the elongate locking member in clamping relation with the first and second rail members, the arrangement being such that when employing said moving means, the first and second rail members are clamped between the plate and elongate locking member for securely retaining the modified sliding lock assembly to the first and second rail members.

9. A sliding connection as set forth in claim 8, said moving means comprising a threaded bolt extending through aligned openings formed in the plate and elongate locking member and a thumb turn member threadably attached at an end of the bolt, whereby upon tightening said thumb turn member, said elongate locking member being moved in clamping arrangement against the first and second rail members.

10. A sliding connection as set forth in claim 6, said elongate tubular body of each track having opposite sides connecting said bottom and top surfaces, said first rail member being mounted on the top surface of the elongate tubular body and said second rail member being mounted on one of said opposite sides.

11. A sliding connection as set forth in claim 10, said sliding lock assembly mounted on said second rail member cooperating with a sliding lock assembly mounted on a second rail member of a track mounted on the other side wall of the pickup truck, each said sliding lock assembly supporting a sliding tailgate movable along the length of the bed of the pickup truck, said locking means securely locking the tailgate at a desired position along the length of the bed of the pickup truck.

12. A sliding connection as set forth in claim 1, said mounting means comprising aligned openings formed in the bottom and top surfaces of the elongate tubular body of the track, a bolt extending through said aligned openings and into a stake pocket formed in the side wall of the pickup truck, an elastomeric spacer disposed over the bolt and received in the stake pocket, and a plate having an opening threadably receiving the bolt, said elastomeric spacer being disposed between the bottom surface of the track and the plate, the arrangement being such that upon tightening the bolt, the plate moves upwardly towards the track for expanding the elastomeric spacer laterally outwardly so that the sides of the elastomeric spacer securely engage the stake pocket of the pickup truck thereby mounting the track on the side wall of the pickup truck.

13. A sliding connection for releasably and adjustably attaching equipment to a pickup truck, said pickup truck having a pair of spaced-apart side walls and a bottom wall which together defines an open bed, said sliding connection comprising:

at least one track mountable on one of said side walls of the pickup truck, said track comprising an elongate tubular body comprising a thin wall which defines substantially the entire outer perimeter of the tubular body, said thin wall having a bottom surface engagable with the side wall of the pickup truck and a top surface opposite the bottom surface, and at least two rail members extending along the length of the tubular body;

means mounting said track onto said side wall; and a sliding lock assembly releasably attachable to one of said rail members and comprising a sliding lock member slidably mounted on said one rail member of the track and movable along the length of the rail member, and means for locking the sliding lock member at a desired position along the length of the rail member, said sliding lock assembly being adapted to support equipment.

14. A sliding connection as set forth in claim 13, said track further comprising an elongate tubular body having a bottom surface engagable with the side wall of the pickup truck and a top surface opposite the bottom surface, one of said two rail members being attached to the top surface of the tubular body.

15. A sliding connection as set forth in claim 14, said rail members of said track being generally rectangular in cross section and integrally formed with the elongate tubular body, said sliding lock member of said sliding lock assembly being generally C-shaped in cross section, said sliding lock member having a bearing plate with a relatively large surface area and a pair of inwardly formed fingers which define an elongate receiving slot sized for receiving the rail member therein.

16. A sliding connection as set forth in claim 15, said elongate tubular body of said track having opposite sides connecting said bottom and top surfaces, the other rail member being mounted on one of said opposite sides.

17. A sliding connection as set forth in claim 16, said sliding lock assembly being mounted on said other rail member and cooperating with a sliding lock assembly mounted on a similarly positioned rail member of the other track, each said sliding lock assembly supporting a sliding tailgate movable along the length of the bed of the pickup truck.

18. A sliding connection as set forth in claim 13 further comprising a modified sliding lock assembly comprising a plate having a surface adapted to support an accessory and a surface having a recess sized for receiving the two rail members therein, and an elongate locking member received between the rail members in such a manner that inner edge portions of the rail members are engageable with the elongate locking member, and means for moving the elongate locking member in clamping relation with the rail members, the arrangement being such that when employing said means for moving said elongate locking member, the rail members are clamped between the plate and elongate locking member for securely retaining the modified sliding lock assembly to the rail members.

19. A sliding connection as set forth in claim 18, said moving means comprising a threaded bolt extending through aligned openings formed in the plate and elongate locking member and a thumb turn member threadably attached at an end of the bolt, whereby upon tightening said thumb turn member, said elongate locking member being moved in clamping arrangement against the rail members.

20. A sliding connection for releasably and adjustably attaching equipment to a pickup truck, said pickup truck having a pair of spaced-apart side walls, each having an upwardly facing surface, and a bottom wall which together with the side walls defines an open bed, said sliding connection comprising:

a track mountable on a side wall of the pickup truck, said track comprising an elongate tubular body having a bottom wall engagable with the upwardly facing surface of the side wall of the pickup truck and a top wall opposite the bottom wall, and a rail member attached to the tubular body and extendable along the length of the body;

means mounting said track onto said upwardly facing surface of the side wall in such a manner that the bottom wall of the tubular body engages the upwardly facing surface of the side wall of the pickup truck, said mounting means comprising a screw fastener having a head portion which is completely disposed within the tubular body of the track and a thread portion which threadably engages and attaches the track to the side wall of the pickup truck; and a sliding lock assembly releasably attachable to the rail member, said sliding lock assembly comprising a sliding lock member slidably mounted on the rail member of the track and movable along the length of the rail member, and means for locking the sliding lock member at a desired position along the length of the rail member.

* * * * *